T. HUDNUT.

HOMINY MILL.

No. 10,057. Reissued Mar. 7, 1882.

WITNESSES:

W. W. Hollingsworth

Edw. W. Byrn.

INVENTOR:

Theo. Hudnut

BY Munn & Co.

ATTORNEYS.

N. PETERS. Photo-Lithographer, Washington, D. C.

UNITED STATES PATENT OFFICE.

THEODORE HUDNUT, OF TERRE HAUTE, INDIANA.

HOMINY-MILL.

SPECIFICATION forming part of Reissued Letters Patent No. 10,057, dated March 7, 1882.

Original No. 122,172, dated December 26, 1871. Reissue No. 5,520, dated August 5, 1873. Application for reissue filed January 27, 1882.

*To all whom it may concern:*

Be it known that I, THEODORE HUDNUT, of Terre Haute, in the county of Vigo and State of Indiana, have invented a new and Improved Hominy-Mill Cylinder; and I do hereby declare that the following is a full, clear, and exact description of the same, reference being had to the accompanying drawings, forming part of this specification.

My invention relates to improvements in the construction of the cutter-carrying cylinders or shafts used in hominy-mills, and mode of attaching the cutters thereto, which said improvements I will first describe, and then indicate more particularly in the claims.

Figure 1:
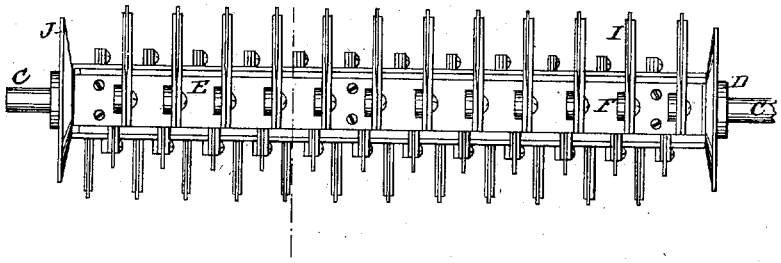
Figure 2:
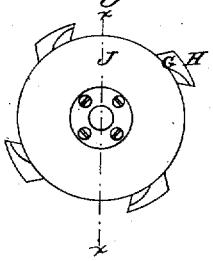
Figure 3:
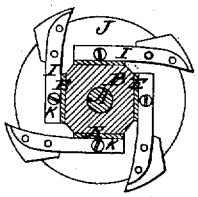
Figure 4:
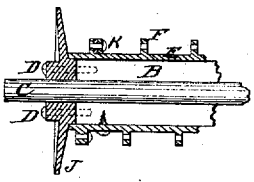

Figure 1 is a side elevation of the cutter-carrying shaft, the cutters, and the means employed for connecting them to said shaft or cylinder. Fig. 2 is an end elevation. Fig. 3 is a cross-section, and Fig. 4 is a longitudinal section taken on the line *x x* of Fig. 2.

Similar letters of reference indicate corresponding parts.

I take a long iron or steel shaft, A, of suitable length and size for the purpose, and fit the wood shaft B upon it, said shaft being as much shorter than the iron shaft as is necessary to have the latter project at each end to form the journals C and receive the gearing for turning it. The said wood shaft is secured to the shaft A by means of the collars D, keyed to the latter and bolted to the shaft B, and it has four or more plain sides, according to the number of rows of cutters it is to carry, each side having a metal plate, E, attached to it. These metal plates have lugs F formed on them at intervals of the same distance apart it is required to have the cutters, the said lugs being arranged with their lengths transversely to the plates, and those of one row are placed a short distance laterally from those of the next rows either way, in such order that they form broken spiral rows around the shaft.

The cutters, which consist of steel plates G, with the inner point of the cutting-edges H projecting over a true circle struck from the axis of the shaft, are bolted to the arms I between them, and these arms are bolted to the lugs F on the plates, being laid across said plates, as clearly shown, so that they are confined against turning on the bolts K by said plates.

The collars D are provided with broad plano-convex disks J, which keep the grain away from the bearings and in contact with the cutters. This arrangement of the arms or holders of the cutters permits of their being readily removed for repairing or removing the cutters.

Having thus described my invention, what I claim as new is—

1. The combination of the shaft B, plates E, lugs F, arms I, cutters G, and the collars D, all substantially as specified.

2. The combination of the cutters G, lugs F, arms I, shaft B, and plates E, substantially as specified.

3. The combination, with the shaft B, of longitudinal side plates formed with rigid lugs, and cutters bolted to said lugs, as and for the purpose described.

4. The combination, with the shaft B and the cutters, of longitudinal side plates formed with rigid lugs, which lugs on one plate alternate with those on the next plate to form broken spirals, as described.

THEODORE HUDNUT.

Witnesses:
W. G. ZERWEKH,
C. L. VELDE.